(12) United States Patent  
Schaffner (10) Patent No.: US 9,083,444 B2  
(45) Date of Patent: Jul. 14, 2015

(54) CHIRP SPREAD SPECTRUM SYSTEM AND METHOD

(71) Applicant: Digi International Inc., Minnetonka, MN (US)

(72) Inventor: Terry Michael Schaffner, Warrenville, IL (US)

(73) Assignee: Digi International Inc., Minnetonka, MN (US)

( * ) Notice: Subject to any disclaimer, the term of this patent is extended or adjusted under 35 U.S.C. 154(b) by 51 days.

(21) Appl. No.: 13/795,973

(22) Filed: Mar. 12, 2013

(65) Prior Publication Data

US 2014/0269843 A1  Sep. 18, 2014

(51) Int. Cl.  
*H04B 1/69* (2011.01)

(52) U.S. Cl.  
CPC ........................................ *H04B 1/69* (2013.01)

(58) Field of Classification Search  
USPC ........................... 375/139, 260, 267, 299, 349  
See application file for complete search history.

(56) References Cited

U.S. PATENT DOCUMENTS

| | | | |
|---|---|---|---|
| 4,532,603 A | 7/1985 | Gerard | |
| 6,396,866 B1 | 5/2002 | Upton et al. | |
| 6,493,405 B1 | 12/2002 | Olaker et al. | |
| 6,943,405 B2 | 9/2005 | Bryant et al. | |
| 7,068,704 B1 | 6/2006 | Orr | |
| 7,177,343 B1 | 2/2007 | Citta et al. | |
| 2003/0022651 A1 | 1/2003 | Bannasch et al. | |
| 2005/0163201 A1 | 7/2005 | Krasner | |
| 2006/0114747 A1 | 6/2006 | Hentati et al. | |
| 2008/0298502 A1 | 12/2008 | Xu et al. | |
| 2008/0309543 A1 | 12/2008 | Schaffner | |
| 2008/0310481 A1 | 12/2008 | Schaffner | |
| 2011/0188559 A1 | 8/2011 | Van Nee | |
| 2013/0034089 A1* | 2/2013 | Nakashima et al. | 370/337 |

FOREIGN PATENT DOCUMENTS

| | | |
|---|---|---|
| EP | 1599001 | 11/2005 |
| EP | 2015463 | 1/2009 |
| EP | 2015464 | 1/2009 |
| WO | 03092183 | 11/2003 |

OTHER PUBLICATIONS

U.S. Patent and Trademark Office, "Examiner's Answer to Appeal Brief", "from U.S. Appl. No. 11/764,579", Feb. 17, 2012, pp. 1-17, Published in: US.

(Continued)

*Primary Examiner* — Kabir A Timory  
(74) *Attorney, Agent, or Firm* — Fogg & Powers LLC (57) ABSTRACT

A radio frequency communication system. The system includes a radio frequency transmitter and a radio frequency receiver, wherein the radio frequency transmitter includes a modulation circuit and an RF modulator, wherein the radio frequency transmitter maps each block of K information bits into a block of N transmit symbols, transforms the block of N transmit symbols by using symbol block repetition and spreads the symbol blocks by multiplying the symbol blocks by a predefined chirp signal, and wherein the radio frequency receiver includes a chirp receiver operable to receive, demodulate and digitize a modulated radio frequency (RF) signal to form a digital baseband signal, and to recover a signal modulated using interleaved single carrier chirp spread spectrum modulation.

5 Claims, 12 Drawing Sheets

(56) References Cited

OTHER PUBLICATIONS

U.S. Patent and Trademark Office, "Final Office Action", "from U.S. Appl. No. 11/764,579", Aug. 6, 2010, pp. 1-12, Published in: US.

U.S. Patent and Trademark Office, "Final Office Action", "from U.S. Appl. No. 11/764,579", May 10, 2011, pp. 1-15, Published in: US.

U.S Patent and Trademark Office, "Office Action ", "from U.S. Appl. No. 11/764,579", Dec. 27, 2010, pp. 1-13, Published in: US.

U.S Patent and Trademark Office, "Pre-Appeal Brief Conference Decision", "from U.S. Appl. No. 11/764,579", Oct. 19, 2010, pp. 1-2, Published in: US.

U.S Patent and Trademark Office, "Examiner's Answer", "from U.S. Appl. No. 11/764,597", Nov. 14, 2011, pp. 1-18, Published in: US.

7 U.S Patent and Trademark Office, "Pre-Appeal Brief Conference Decision", "from U.S. Appl. No. 11/764,597", Jul. 22, 2011, pp. 1-2, Published in: US.

U.S. Patent and Trademark Office, "Office Action", "from U.S. Appl. No. 13/209,744", Mar. 29, 2013, pp. 1-15, Published in: US.

Hengstler et al., "A Novel Chirp Modulation Spread Spectrum Technique for Multiple Access", "2002 IEEE Seventh International Symposium in Spread Spectrum Techniques and Applications", 2002, pp. 1-5.

Kowatsch, "A Spread-Spectrum Concept Combining Chirp Modulation and Pseudonoise Coding", "IEEE Transactions on Communications", Oct. 1983, pp. 1133-1142, vol. 31, No. 10.

Springer et al., "Spread Spectrum Communications Using Chirp Signals", "Information Systems for Enhanced Public Safety and Security", 2000, pp. 1-6, Publisher: IEEE/FCEA EUROCOMM 2000.

* cited by examiner

CHIRP SPREAD SPECTRUM SYSTEM AND METHOD

BACKGROUND

In certain long range data communication and telemetry applications, the exchange of information occurs at a relatively lower data rate. In such applications, it can be advantageous to build a low to medium data rate system that possesses the characteristics of a widely variable data rate system, but with reduced power requirements.

For an RF communication system the power amplifier (PA) is commonly the main contributor to the power consumption of the system. The Peak to Average Power Ratio (PAPR) of the transmit signal impacts the required linearity and peak transmit power specification of the PA. That is, PAPR drives average power. By lowering the PAPR of the transmit signal, the power consumption, cost, and heat dissipation of the PA can be reduced.

There are many solutions for reducing PAPR. Some of these involve predicting peaks in the filtered transmit signal and reducing the peaks by modifying the pre-filtered transmit signal. These methods introduce distortion and are limited in the amount they reduce peak power.

A different method for reducing PAPR is to construct a transmit signal waveform that naturally has a low peak to average ratio. For Orthogonal Frequency Division Multiplex modulation, a method for reducing the PAPR is to pre-code the transmit modulation symbols using a Fourier Transform. This technique, used in Long Term Evolution (LTE) 4G cellular systems, essentially gives the multi-carrier OFDM signal the characteristics of a much lower PAPR single carrier signal.

Pre-coded OFDM or FDMA does not solve the problem since this type of modulation is designed for high rate (>1 bps/Hz) and is not extensible to lower data rates (<<1 bps/Hz) that operate at very low signal to noise ratios.

A reduced power system and method for transmission of data at low data rates is needed.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

As noted above, it can be advantageous in certain low data rate, long range data communication and telemetry applications, to build a low to medium data rate system. It can be particularly advantageous to build a low to medium data rate system that possesses the characteristics of a widely variable data rate system (i.e., high sensitivity, wideband frequency diversity, and a near constant transmit envelope), but with reduced power requirements.

Figure 1:
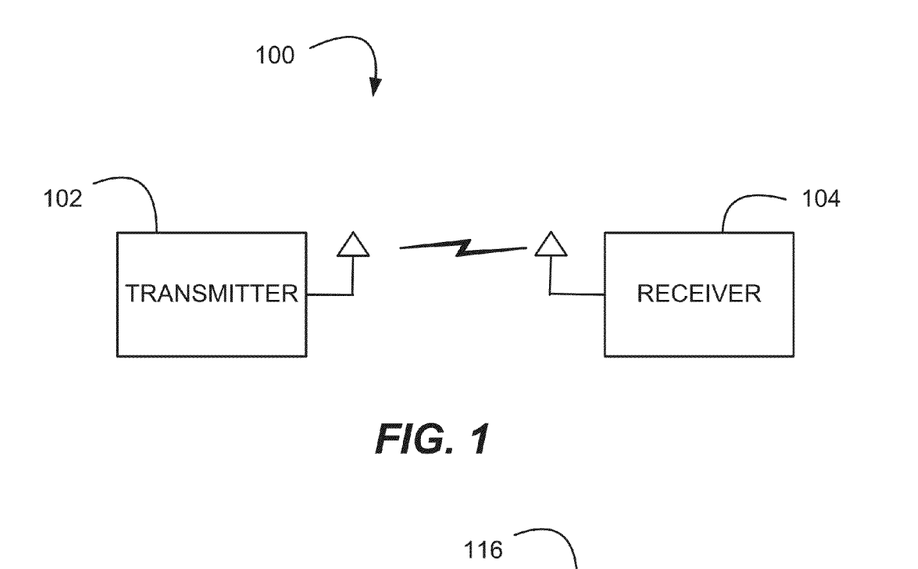
FIG. 1 shows a chirp-based communications system, consistent with an example embodiment of the invention.

One such system is shown in FIG. 1. In FIG. 1, chirp spread spectrum transmission modulation system 100 includes a transmitter 102 and a receiver 104.

In one embodiment, PAPR is reduced via a multi-channel chirp spread spectrum modulation method that produces a transmit signal with a low PAPR characteristic. In one such embodiment, system 100 is implemented as a point-to-point system using low cost radios.

Figure 2A:
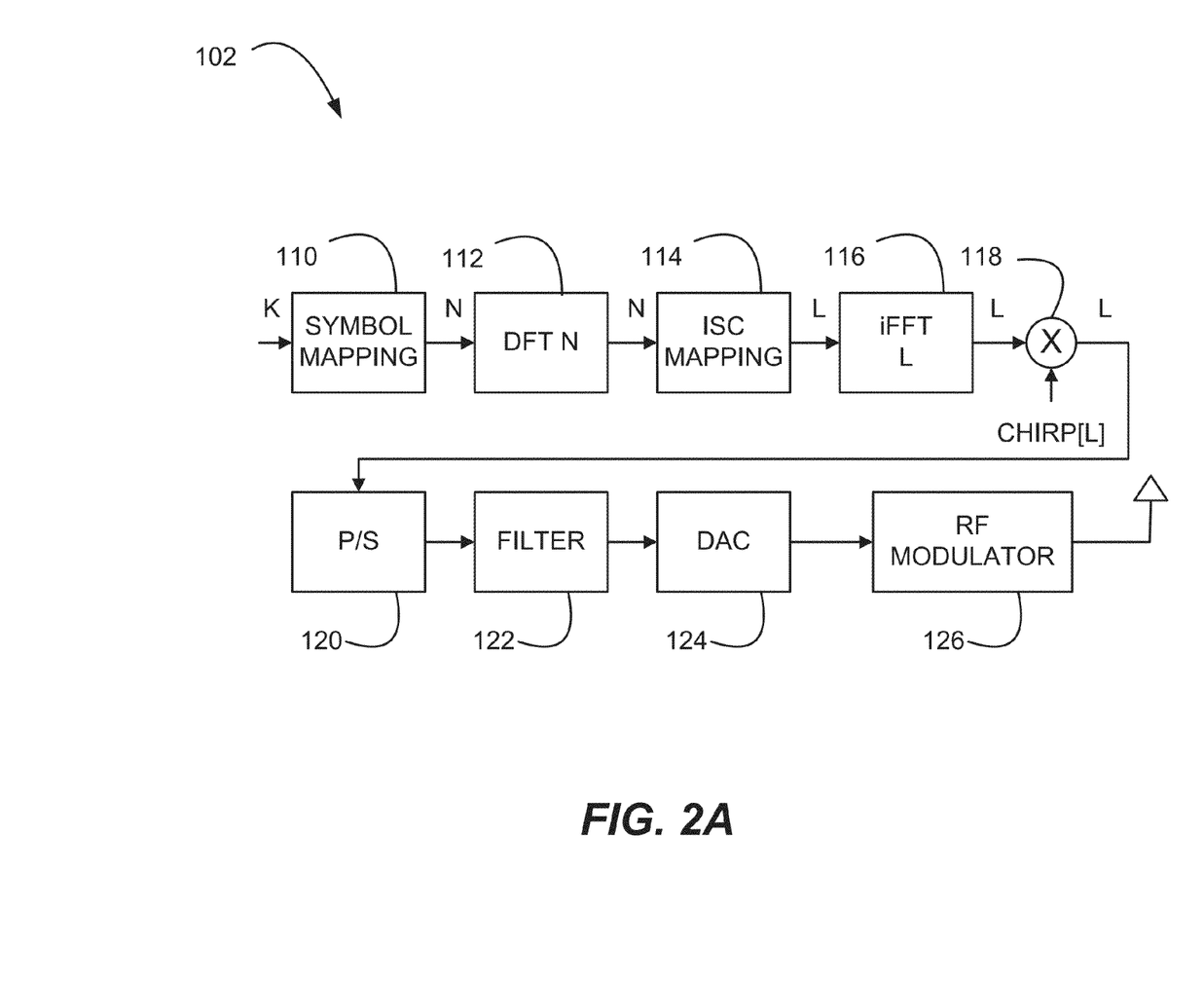
FIGS. 2A and 2B illustrate a transmitter, consistent with an example embodiment of the invention.

In one embodiment, as is shown in FIG. 2a, transmitter 102 is an interleaved single carrier chirp spread spectrum (Interleaved SC-CSS) transmitter that performs a pre-coding function at 112 based on a Discrete Fourier Transform (DFT) prior to sub-carrier mapping at 114. In the approach shown in FIG. 2a, the pre-coding function is an N point Discrete Fourier Transform (DFT). In the embodiment shown, this pre-coding function is added to the transmitter in order to reduce the Peak to Average Power Ratio (PAPR). When N is a power of 2 the DFT may be efficiently performed using a Fast Fourier Transform (FFT) algorithm.

In the approach shown in FIG. 2a, a block of K information bits is mapped at 110 to a block of N transmit symbols. The symbols may be BPSK, QPSK, QAM, or any other known type of modulation. The block of symbols, represented as a matrix of complex-valued data, are transformed at 112 into the frequency domain via an N point DFT. The N frequency domain values are then mapped at 114 to the inputs of an L-point iFFT using an interleaved subcarrier mapping. This maps each coded symbol to an individual subcarrier. An L point iFFT then transforms the data to the time domain at 116.

Figure 2B:
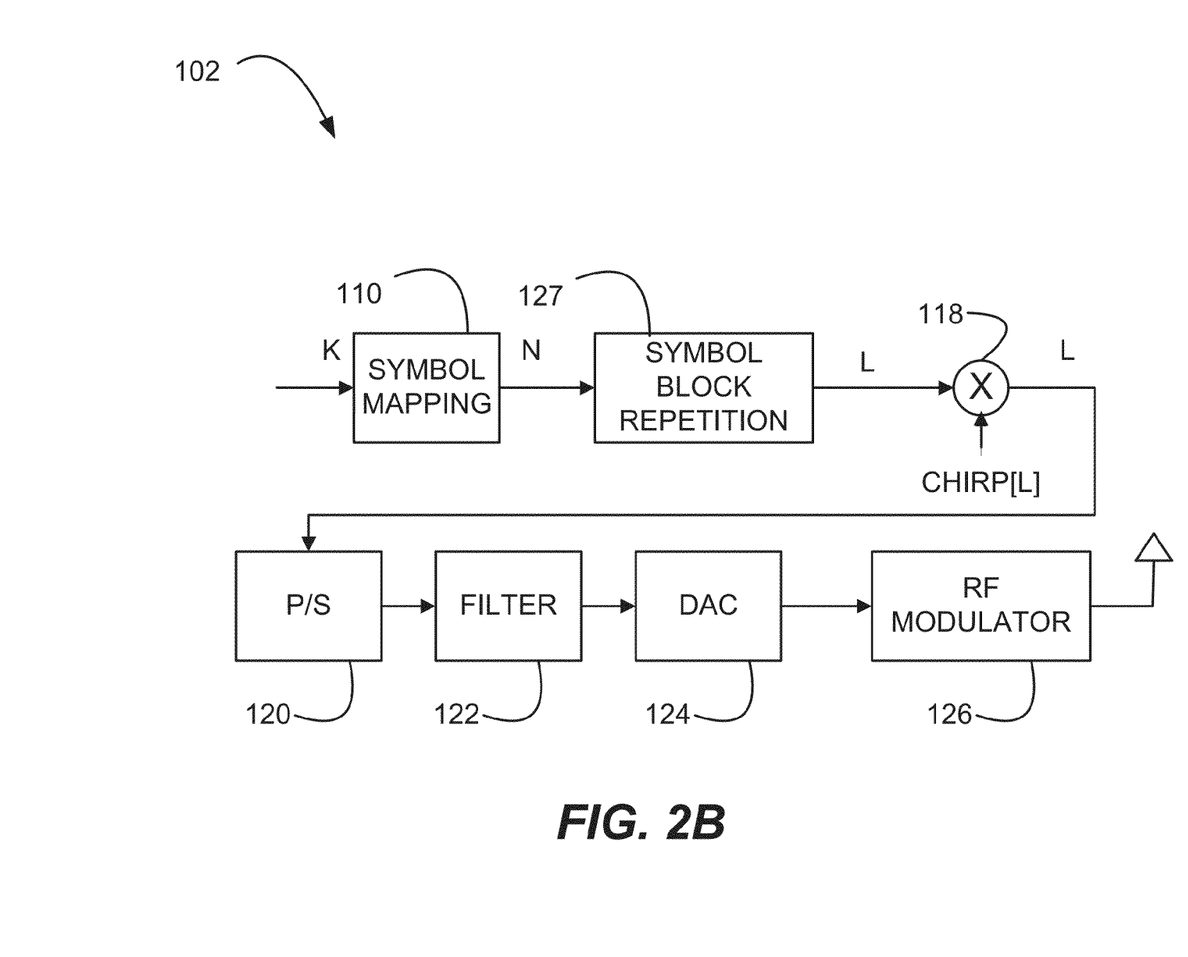
Figure 3:
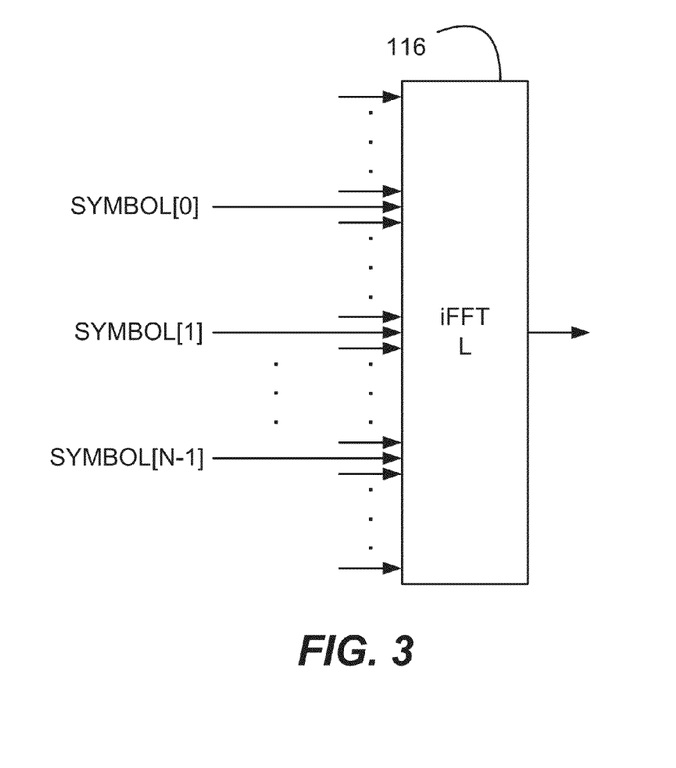
FIG. 3 shows a method of interleaving symbols, consistent with an example embodiment of the invention.

A representative interleaved subcarrier mapping is shown in FIG. 3. As can be seen in FIG. 3, in an interleaved subcarrier mapping consecutive subcarriers are distributed, or interleaved. In one example embodiment, every L/N subcarrier is used as shown in FIG. 3. For interleaved subcarrier mapping, the transmit symbol transformation may be mathematically represented more simply in the time domain. One such example is shown in FIG. 2b below.

In one embodiment, as is shown in FIG. 2a, transmitter 102 implements interleaved single carrier chirp spread spectrum (Interleaved SC-CSS) modulation. In this approach, the block of time domain data produced at 116 is multiplied by a chirp sequence at 118. This multiplication spreads each subcarrier across the occupied bandwidth of the system. Each coded symbol is then effectively mapped to an orthogonal chirp time offset. The mapping is spaced sufficiently to allow for multipath reception at the receiver without introducing any inter-channel interference.

The output from 118 is then serialized (via a parallel to serial converter at 120), up-sampled and low pass filtered at 122, and then converted to an analog signal by a digital to analog converter (DAC) at 124. The analog signal is then, at 126, converted to an RF signal, amplified, and routed to an antenna for transmission over the air.

If not for the DFT pre-coding the PAPR of transmitter 102 would be high due to the fact that the transmit signal consists of the sum of multiple pseudo-random orthogonal symbols. With DFT pre-coding, however, the transmit signal characteristics are like that of a single carrier transmission, resulting in a pre-filtered signal having a constant envelope, or a PAPR value of one.

The Interleaved SC-CSS transmitter 102 may be represented more simply in the time domain. This is shown in FIG. 2b. Representing the symbol transformation entirely in the time domain simplifies the processing. The block of N symbols are simply repeated L/N times at 127. At the receiver, the demodulator is able to recover the symbols by equalizing the signal in the frequency domain, similar to the uncoded FDMA case.

Figure 4:
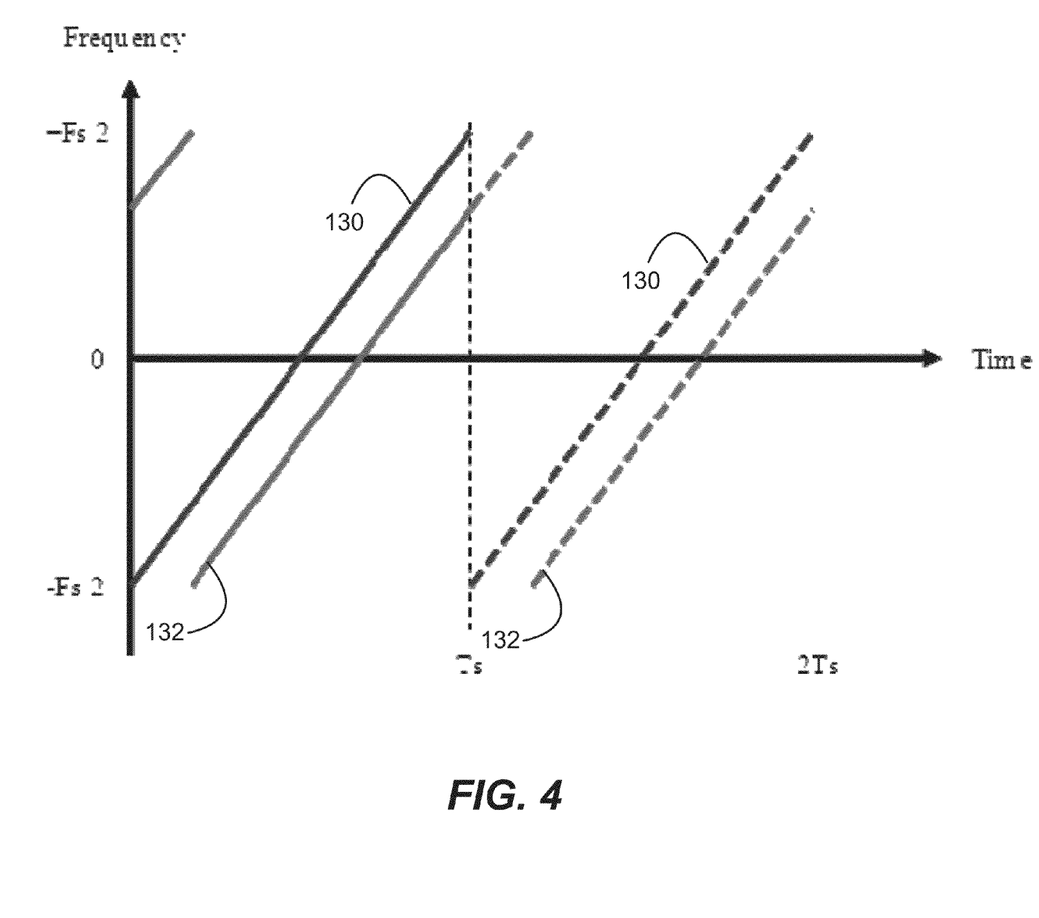
FIG. 4 shows a modulated signal, consistent with an example embodiment of the invention.

An example chirp signal that can be used in the transmitter 102 of FIGS. 2a and 2b is shown in FIG. 4. FIG. 4 shows a plot of frequency versus time for two symbols using Interleaved SC-CSS modulation. In this figure only two channels are shown for clarity. Both channels, one labeled 130 and the other labeled 132, sweep the full bandwidth using the same discrete frequencies. In one example embodiment, 32 channels and 1024 discrete frequencies are used across the bandwidth $F_s$. Channels 130 and 132 are orthogonal due to the time offset between them. In addition, in some embodiments, the channels are separated sufficiently to prevent multipath from causing inter-channel interference.

A disadvantage of the method of modulation of FIGS. 2a and 2b is that the number of symbols, N, per transmit block, L, is limited due to the risk of inter-channel interference. Therefore, this structure is best used for low data rates. To achieve higher data rates another type of chirp spreading is employed. One embodiment of a transmitter 102 using this alternate type of spreading and multiplexing is shown in FIGS. 5a and 5b.

In this method the block of coded symbols is repeated and multiplied by an interpolated chirp sequence in the frequency domain. The chirp sequence length is equal to L/N, as is the number of block repetitions. Each coded symbol is therefore spread by a length L/N chirp sequence. Instead of spreading each coded symbol with the same chirp sequence, the chirp signal is interpolated at 128 by a factor of N to improve the PAPR of the time domain signal. This method results in a PAPR of unity for the pre-filtered transmit signal. With interleaved single carrier orthogonal chirp division multiplexing (Interleaved SC-OCDM), multipath will not cause inter-channel interference since each channel occupies a different set of frequencies. However, frequency offset error at the receiver will cause inter-channel interference (ICI). Accurate frequency estimation is therefore required for this method. For lower data rates that operate at low signal to noise ratios, the Interleaved SC-CSS modulation is a better choice due to the inaccurate frequency offset estimates that may occur when receiving weak signals. For higher data rates the Interleaved SC-OCDM modulation is a better choice due to the reduced ICI.

Figure 5A:
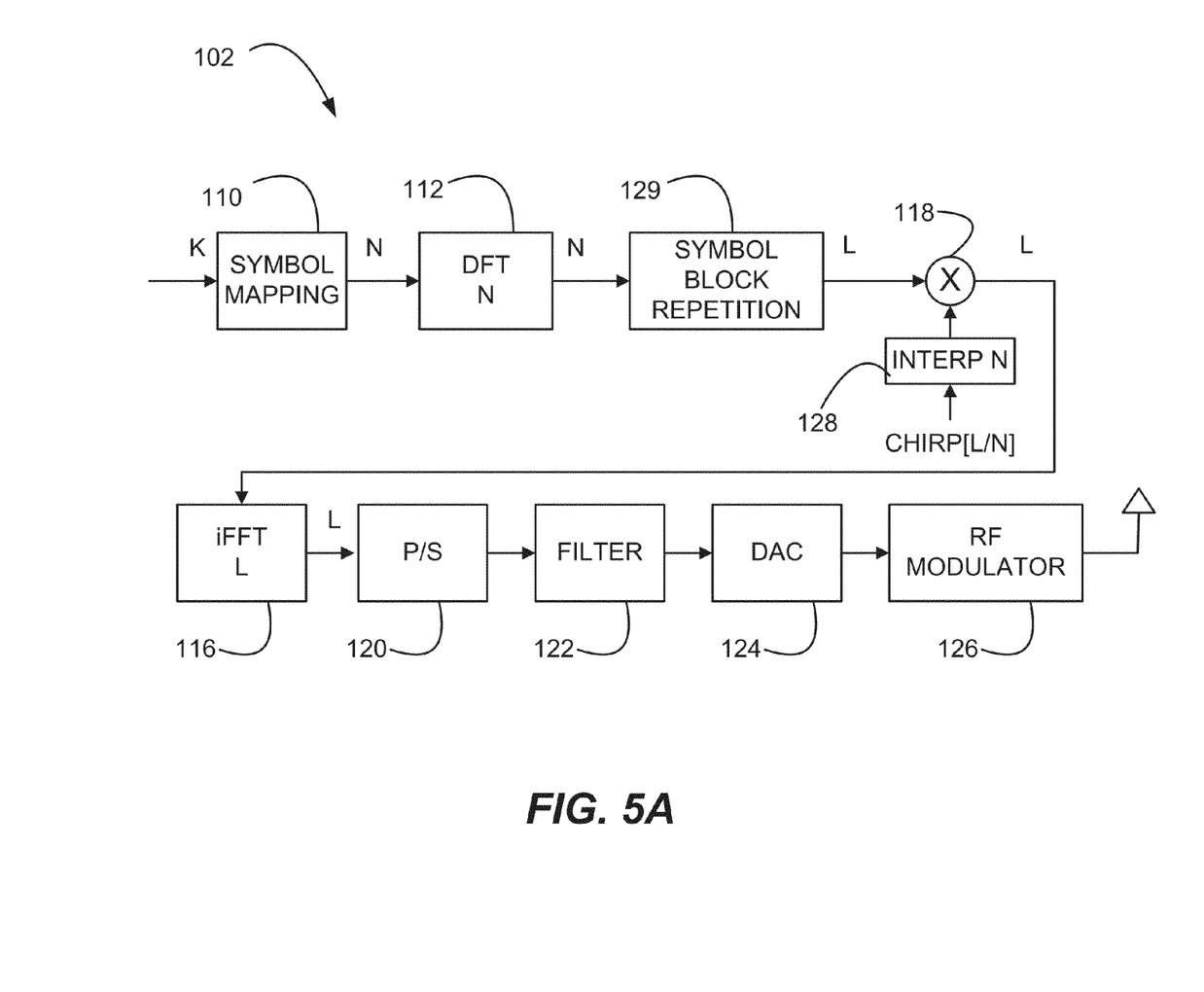
FIGS. 5A and 5B illustrate a transmitter, consistent with an example embodiment of the invention.
Figure 5B:
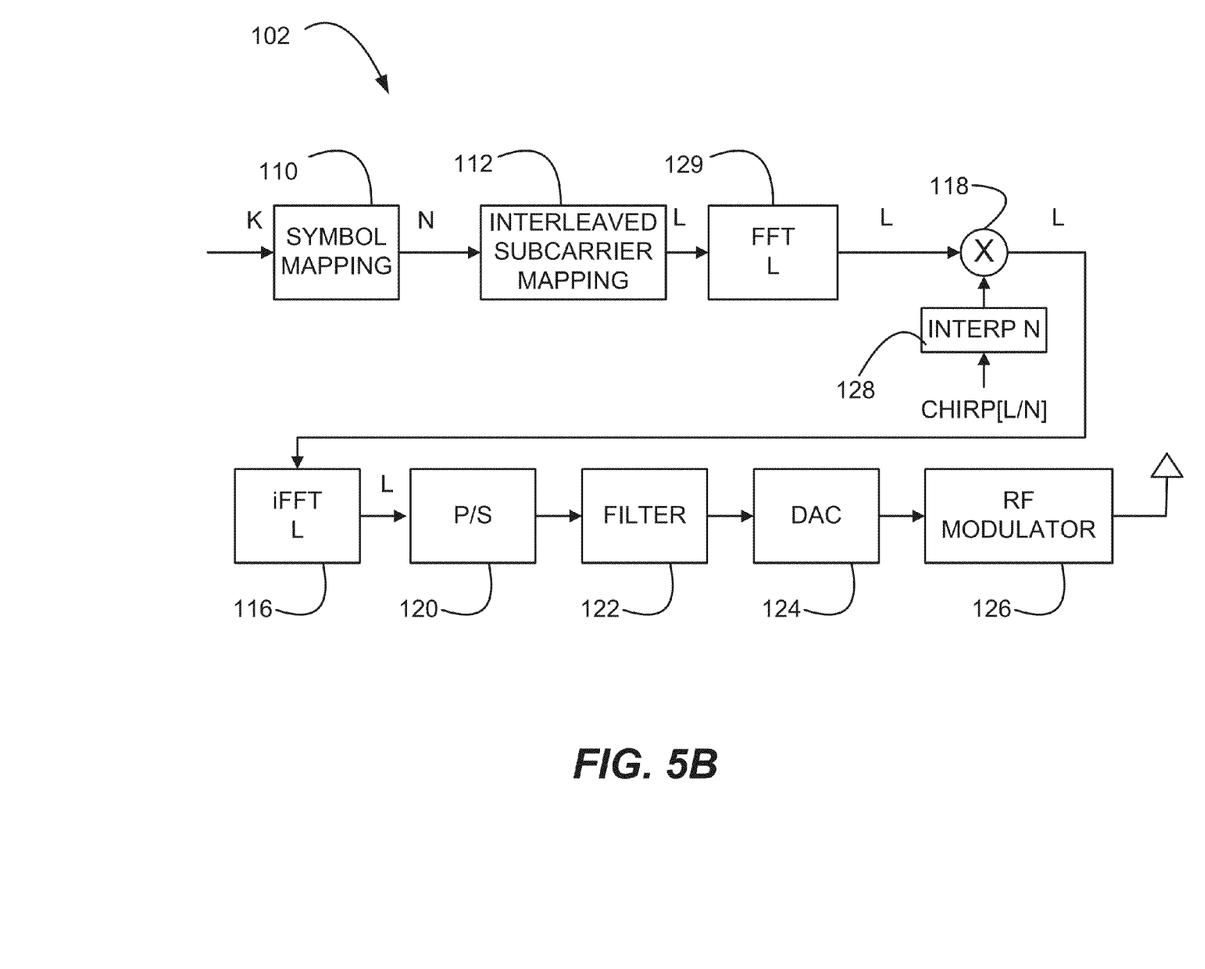

In the approach shown in FIG. 5a, a block of K information bits is mapped at 110 to a block of N transmit symbols. The symbols may be BPSK, QPSK, QAM, or any other known type of modulation. The block of symbols, represented as a matrix of complex-valued data, are transformed at 112 into the frequency domain via an N point DFT. The block of N symbols in the frequency domain are simply repeated L/N times at 129 and then spread at 118 using an interpolated chirp sequence. In the example shown, the chirp sequence length is equal to L/N. The chirp sequence is interpolated at 128.

The L frequency domain values are then converted back into the time domain at 116 mapped at 114 to the inputs of an L-point iFFT using an interleaved subcarrier mapping. This maps each coded symbol to an individual subcarrier. An L point iFFT then transforms the data to the time domain at 116.

The transmit symbol transformation may also be mathematically represented in the time domain as shown in FIG. 5b.

Figure 6:
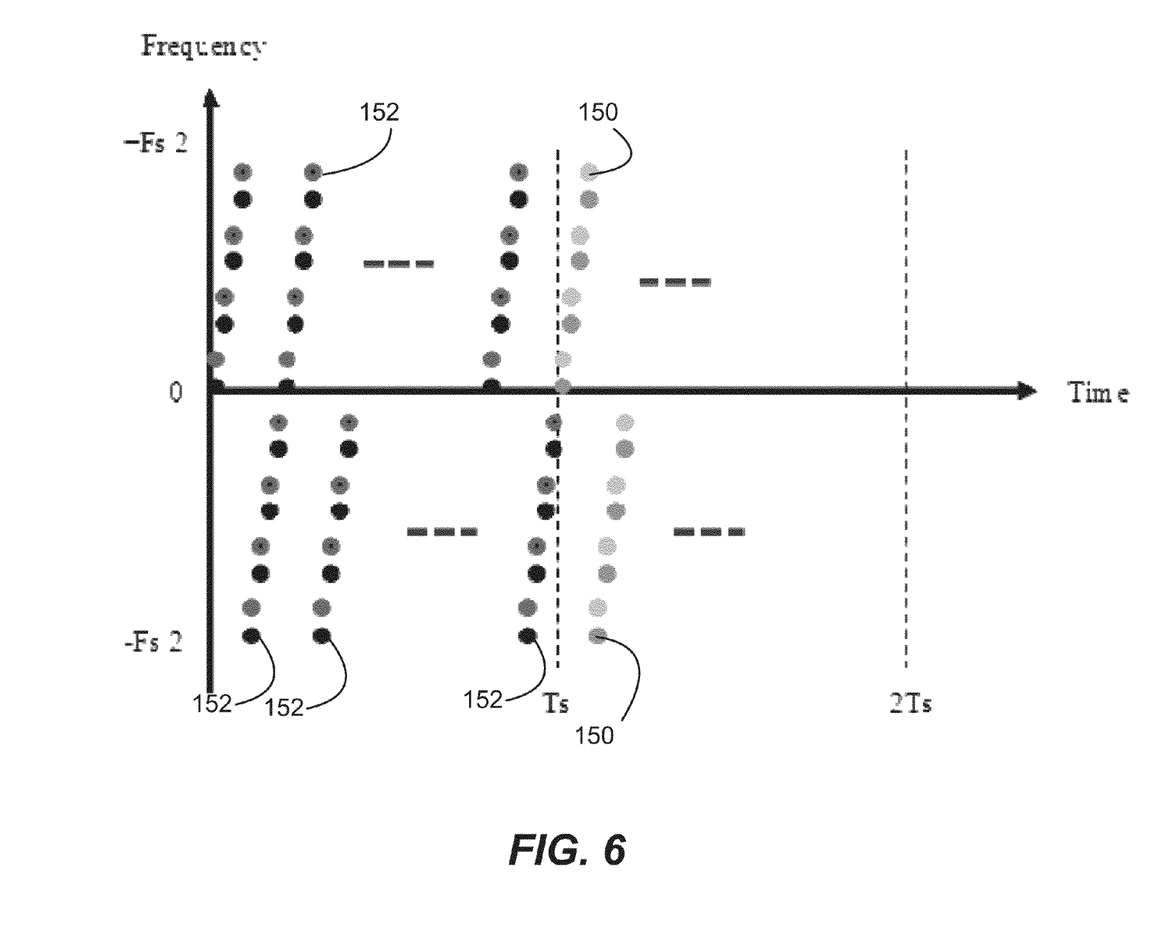
FIG. 6 shows a modulated signal, consistent with an example embodiment of the invention.

FIG. 6 is a spectral plot of two symbols using Interleaved SC-OCDM modulation. The figure shows frequency versus time for two channels, one black/dark grey (152) the other medium gray/light grey (150), assuming a chirp length of 8 samples. The orthogonality of the two channels is due to the fact the channels operate on separate discrete frequencies.

Figure 7:
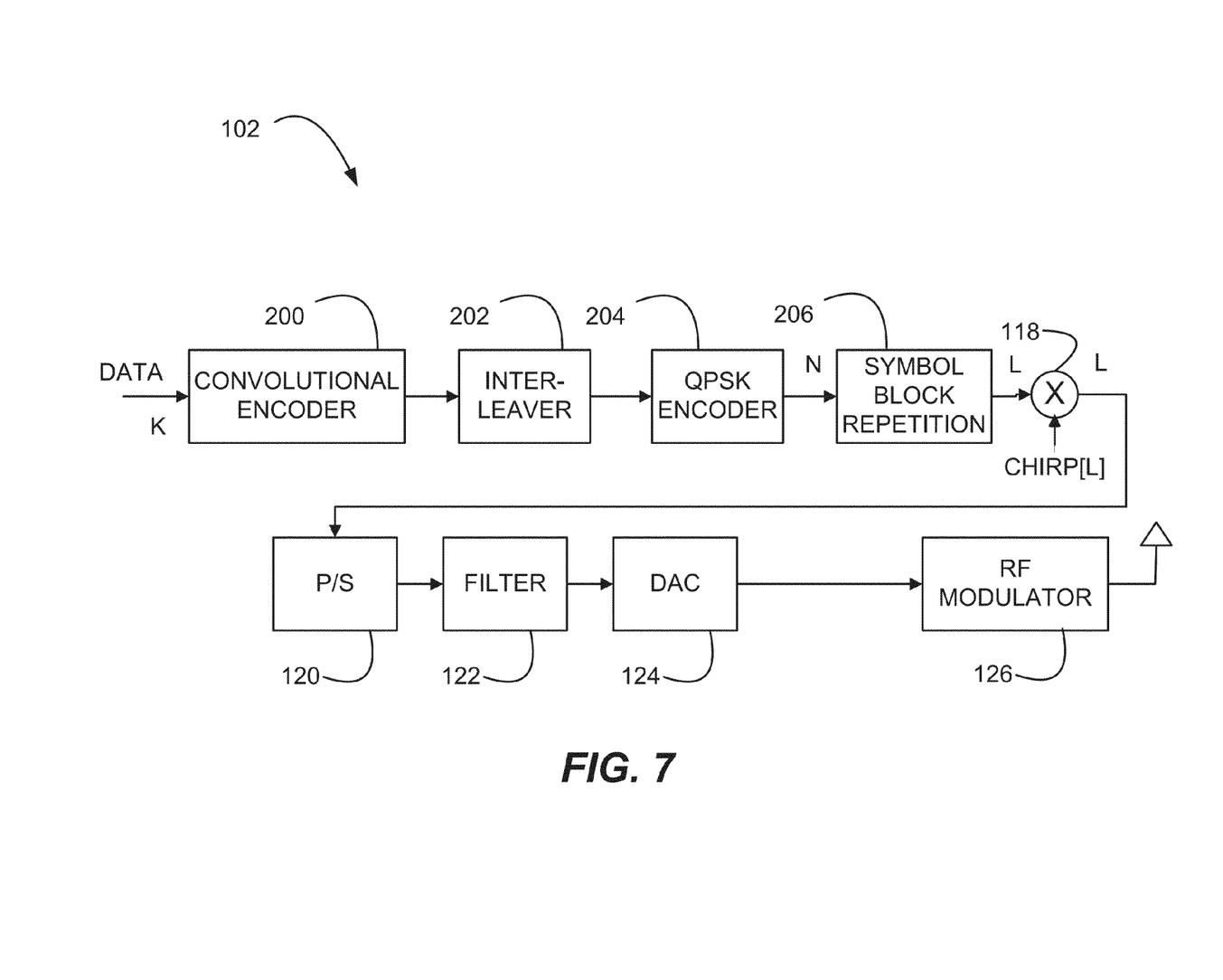
FIGS. 7 and 8 illustrate transmitters, consistent with example embodiments of the invention.

An example embodiment of Interleaved SC-CSS is shown in FIG. 7. In the example embodiment shown in FIG. 7, a block of K information bits is encoded at 202. In one such embodiment, forward error correction is used to provide a more robust communication link and to provide higher sensitivity at the receiver 104. The information data is encoded by a convolutional encoder at 202 and the coded bits are distributed within a block of data by an interleaver at 204. The coded bits are then mapped to modulation symbols by a QPSK encoder at 206. In both embodiments the number of symbols, N, and the transmit block length, L, are powers of 2 with N<L. In the OCDM case, since N is a power of 2, the pre-coding is efficiently performed with an N point FFT at 208.

Figure 8:
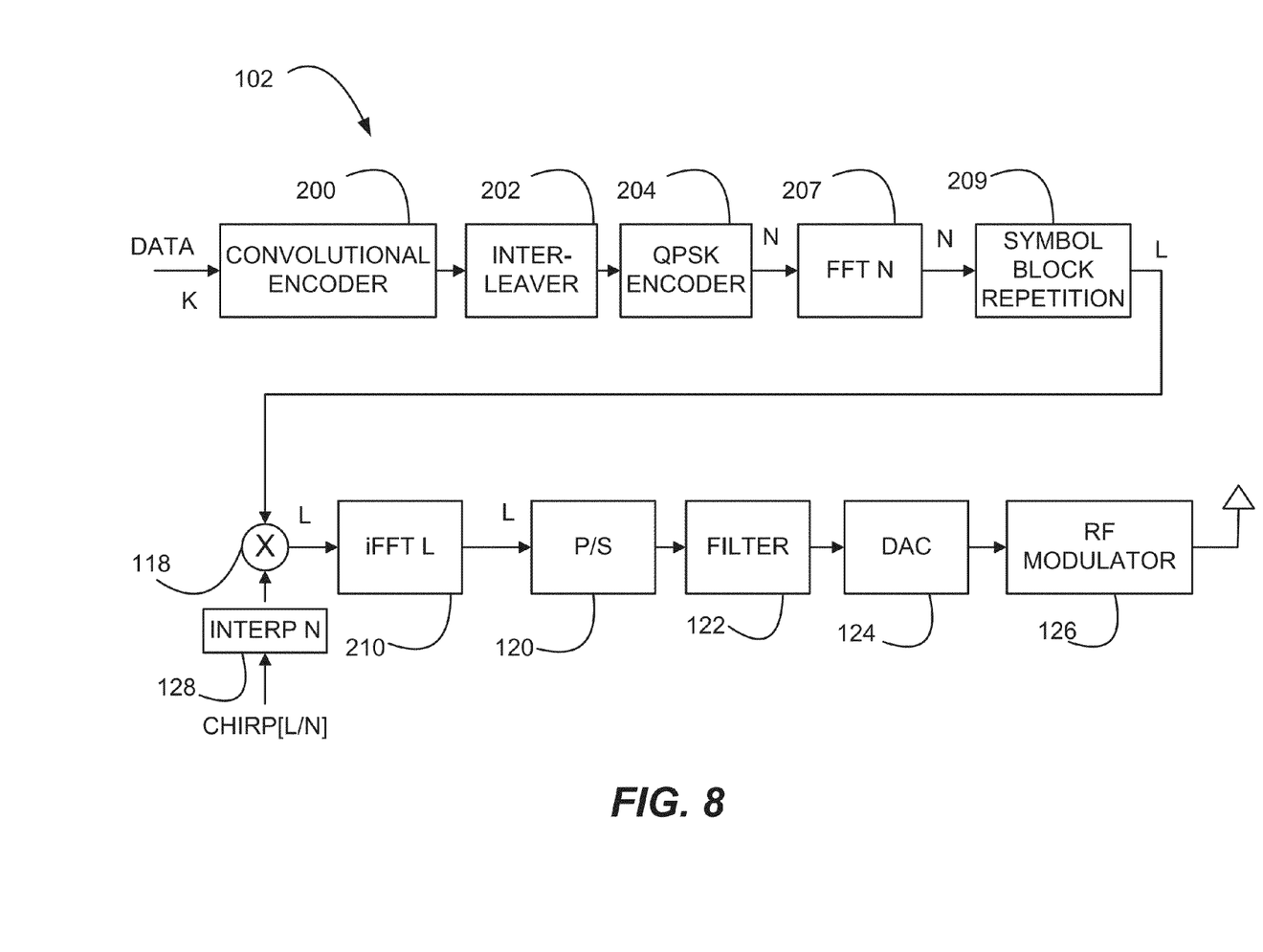

An example embodiment of Interleaved SC-OCDM is shown in FIG. 8. In the example embodiment shown in FIG. 8, a block of K information bits is encoded at 202. In one such embodiment, forward error correction is used to provide a more robust communication link and to provide higher sensitivity at the receiver 104. The information data is encoded by a convolutional encoder at 202 and the coded bits are distributed within a block of data by an interleaver at 204. The coded bits are then mapped to modulation symbols by a QPSK encoder at 206. In both embodiments the number of symbols, N, and the transmit block length, L, are powers of 2 with N<L. In the OCDM case, since N is a power of 2, the pre-coding is efficiently performed with an N point FFT at 208.

In some example embodiments of transmitter 102 shown in FIGS. 7 and 8, L is equal to 1024. Due to the large symbol length, no cyclic prefix is added to each transmission symbol (since the degradation due to ISI is small).

Figure 9:
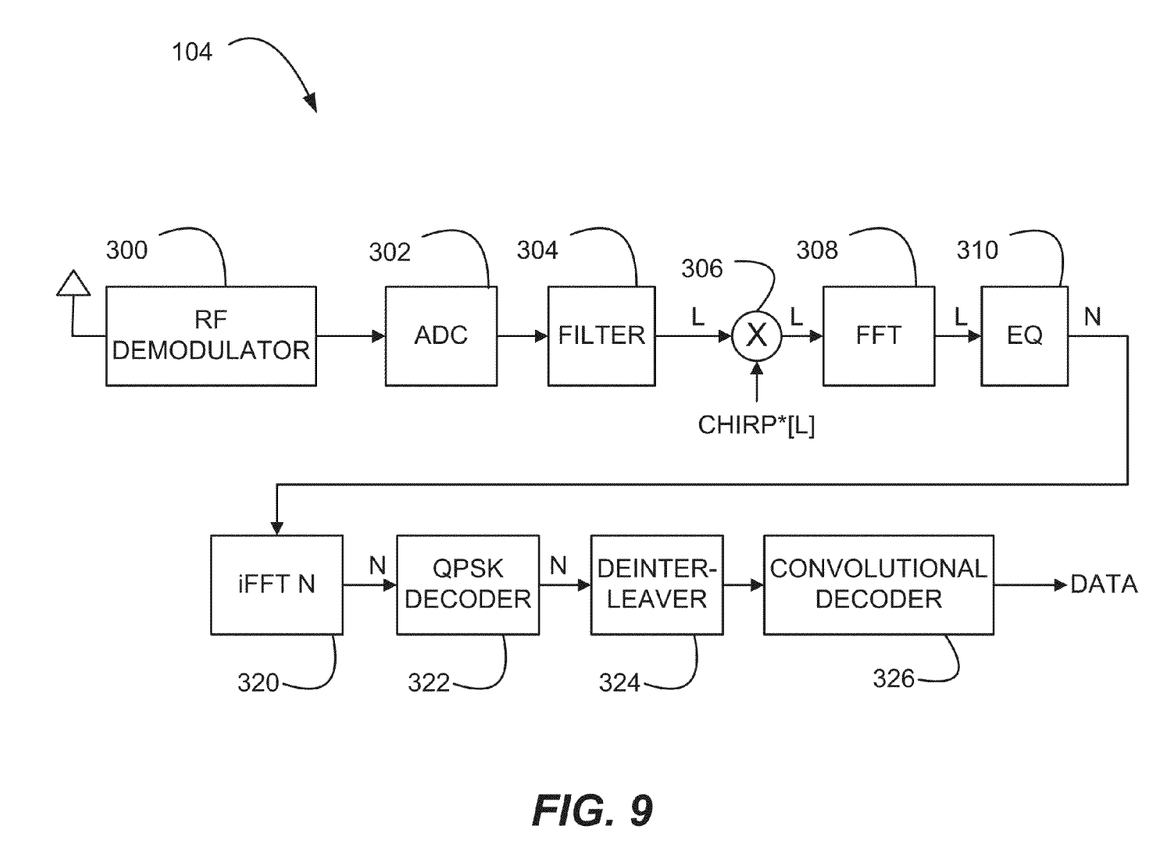
FIG. 9 illustrates a receiver, consistent with an example embodiment of the invention.

FIG. 9 shows a diagram of a receiver 104 which may be used to receive the signal transmitted by the Interleaved SC-CSS transmitter as shown in FIG. 7. An RF demodulator 300 down-converts the RF signal to an analog baseband signal. The analog signal is converted to a digital baseband signal with an Analog to Digital Converter 302. The digital baseband signal is then low-pass filtered by a digital filter 304. The digital stream of data from the output of the filter is then correlated with the conjugate of the chirp signal at 306. This is accomplished by buffering the data into a block of L samples, multiplying the block of data sample by sample with the conjugate of the length-L chirp signal, and then performing, at 308, a length L Fourier transform on the data.

The data from the FFT is then equalized at 310 to form N data values, where N is the number of sub-channels. The N values are transformed at 320 by an N-point inverse Fourier transform to obtain N demodulation symbols. A QPSK decoder decodes the demodulation symbols at 322 to form codec symbols. The codec symbols are then de-interleaved at 324 and convolutionally decoded at 326 to obtain the recovered information data. In the embodiment shown the underlying modulation scheme is QPSK, but any other modulation may be used such as BPSK or m-ary QAM. In addition, the embodiment shown in FIG. 9 employs convolution coding error correction. The receiver 104 may use no forward error correction, or it may employ other known error correction codes such as Reed-Solomon, LDPC codes, or turbo codes.

Figure 10:
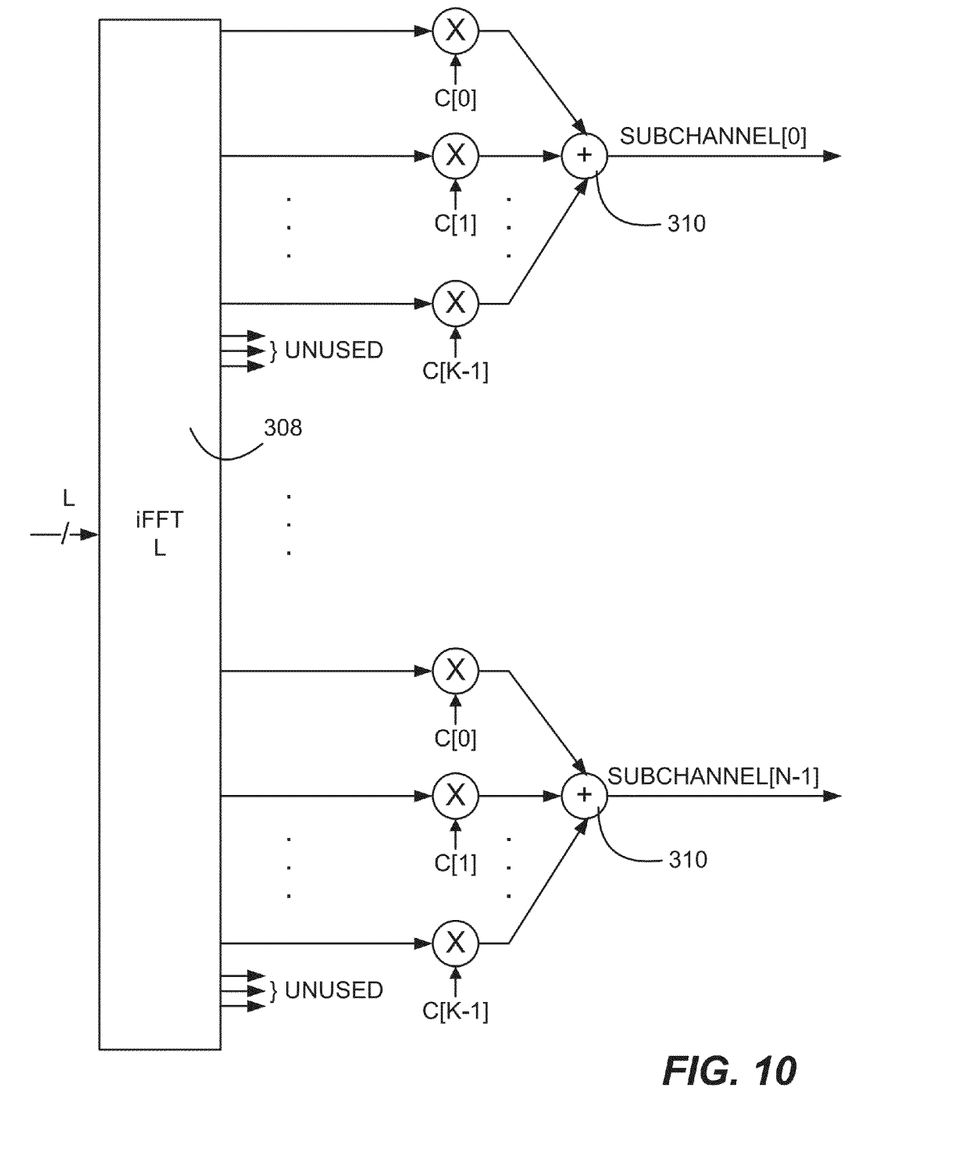
FIG. 10 illustrates a Fast Fourier Transform and equalizer, consistent with an example embodiment of the invention.

An L-point FFT 308 that can be used in the SC Interleaved CSS Receiver 104 of FIG. 9 is shown in FIG. 10. The figure depicts a K-tap equalizer 310 with N sub-channels. The outputs from the FFT are multiplied by the complex conjugate of the channel impulse response, $C_k$. The results of the multiplications are summed to form a complex value for each of the sub-channels.

Figure 11:
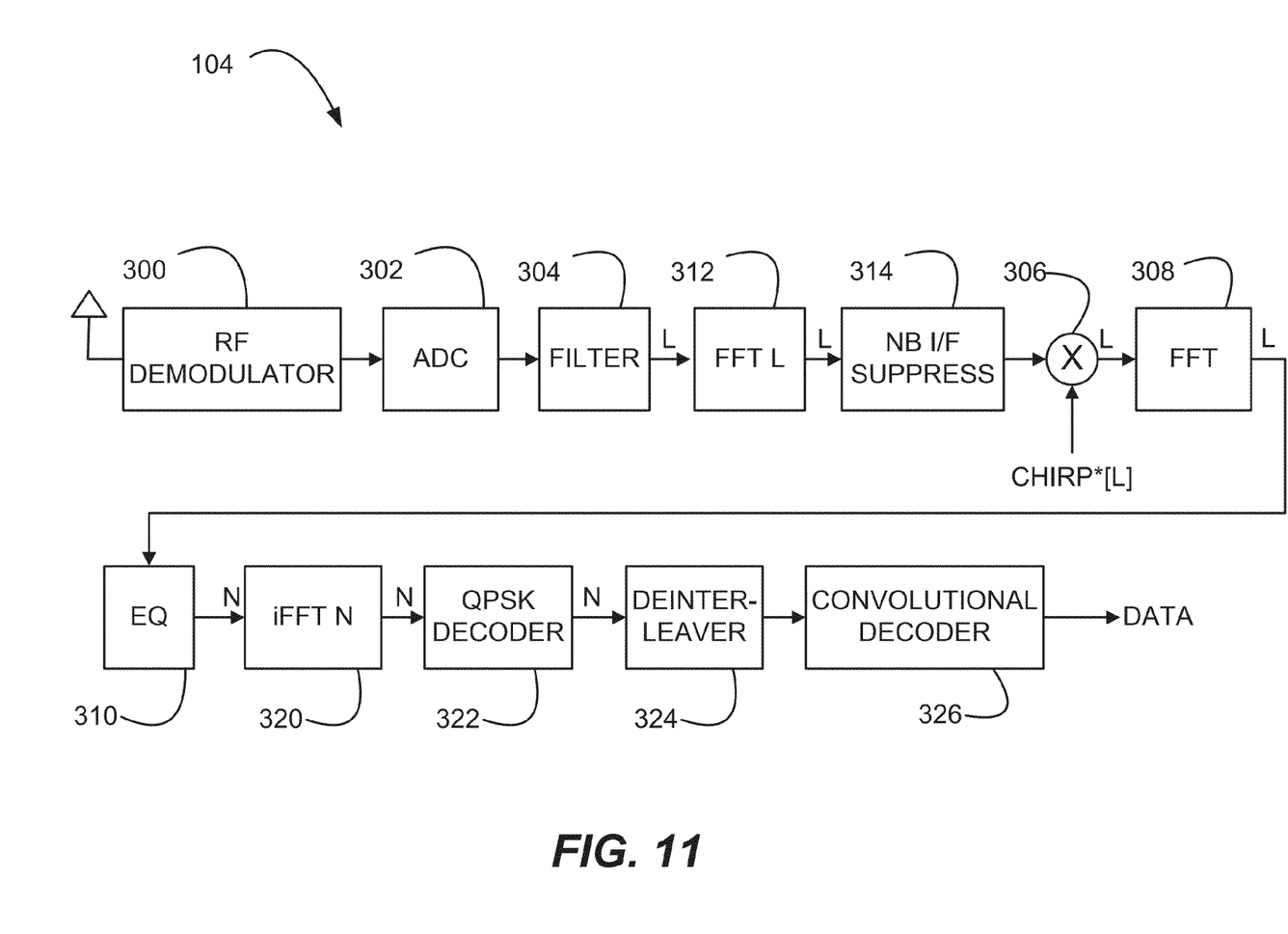
FIG. 11 illustrates a receiver, consistent with an example embodiment of the invention.

An SC Interleaved CSS Receiver which employs frequency domain demodulation is illustrated in FIG. 11. In the example embodiment of FIG. 11, the filtered, digital baseband signal is first buffered into a block of L samples and converted into the frequency domain using an L point FFT 312. Conversion into the frequency domain may be desirable in order to easily filter (at 314) any narrowband interference which may appear in the pass-band. Following narrowband suppression, the block of data is correlated with the chirp signal at 306 by multiplying the data with the length L chirp signal, then performing an L point FFT at 308. The remaining processing is the same as the time domain demodulator case as presented in FIG. 9.

The above described chirp spread spectrum modulation methods have the advantage that they exhibit low transmit signal PAPR, scalable data rates, wideband signal with multipath recoverable at receiver, coherent, high sensitivity acquisition and demodulation, high processing gains that are robust to interference and low inter-symbol and inter-channel interference.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. A method of modulating data for transmission, comprising:
    mapping a block of K information bits, K being a number of information bits, to a block of N transmit symbols, N being a number of transmit symbols, wherein N is greater than one;
    transforming the block of N transmit symbols to a block of N subcarriers in the frequency domain;
    repeating the block of N frequency domain subcarriers to form a block of L frequency domain subcarriers, L being a number of frequency domain subcarriers;
    interpolating a chirp sequence by a factor of N to form an interpolated chirp sequence;
    multiplying the repeated block of L frequency domain subcarriers by the interpolated chirp sequence to form chirp spread subcarriers; and
    transforming the chirp spread subcarriers into a block of time domain data for transmission;
    wherein the block of time domain data is of length L and the chirp sequence is of length L/N such that the interpolated chirp sequence is of length L.

2. The method of modulating of claim 1, wherein the symbol mapping is Quadrature phase-shift keying (QPSK).

3. The method of modulating of claim 1, wherein the symbol mapping is Binary phase-shift keying (BPSK).

4. The method of modulating of claim 1, wherein the symbol mapping is quadrature amplitude modulation (QAM).

5. A radio frequency communication system, comprising:
    a radio frequency transmitter, wherein the radio frequency transmitter includes a modulation circuit and an RF modulator, wherein the radio frequency transmitter maps each block of K information bits into a block of N transmit symbols, wherein N is greater than one, transforms the block of N transmit symbols to subcarriers in the frequency domain; repeats the block of N frequency domain subcarriers to form a block of L frequency domain subcarriers; interpolates a chirp sequence by a factor of N to form an interpolated chirp sequence; and multiplies the repeated block of L frequency domain subcarriers by the interpolated chirp sequence to form chirp spread subcarriers; and
a radio frequency receiver, wherein the radio frequency receiver includes a chirp receiver operable to receive, demodulate and digitize a modulated radio frequency (RF) signal to form a digital baseband signal, and to recover a signal modulated using interleaved single carrier chirp spread spectrum modulation.

\* \* \* \* \*